July 5, 1966 P. A. G. LEPELLETIER 3,259,214
SELF-ENERGIZING, SPOT TYPE BRAKE MEANS
Filed May 21, 1964 10 Sheets-Sheet 1

INVENTOR:
PIERRE ANDRÉ GEORGES LEPELLETIER
By Irvin S. Thompson
ATTORNEY

July 5, 1966 P. A. G. LEPELLETIER 3,259,214
SELF-ENERGIZING, SPOT TYPE BRAKE MEANS
Filed May 21, 1964 10 Sheets-Sheet 6

INVENTOR:
PIERRE ANDRÉ GEORGES LEPELLETIER
BY Irvin S. Thompson
ATTORNEY

July 5, 1966   P. A. G. LEPELLETIER   3,259,214
SELF-ENERGIZING, SPOT TYPE BRAKE MEANS
Filed May 21, 1964   10 Sheets-Sheet 8

FIG.9

INVENTOR:
PIERRE ANDRÉ GEORGES LEPELLETIER
BY Irvin S. Thompson
ATTORNEY

July 5, 1966  P. A. G. LEPELLETIER  3,259,214
SELF-ENERGIZING, SPOT TYPE BRAKE MEANS
Filed May 21, 1964  10 Sheets-Sheet 10

INVENTOR:
PIERRE ANDRÉ GEORGES LEPELLETIER
BY Irwin J. Thompson
ATTORNEY

United States Patent Office 3,259,214
Patented July 5, 1966

3,259,214
SELF-ENERGIZING, SPOT TYPE BRAKE MEANS
Pierre André Georges Lepelletier, Chatou, France, assignor to Societe Anonyme Francaise du Ferodo, a corporation of France
Filed May 21, 1964, Ser. No. 369,213
Claims priority, application France, May 25, 1963, 936,017
23 Claims. (Cl. 188—152)

The present invention relates to brakes or the like, especially for automotive vehicles, that is to say having a rotating member fast for rotation with a wheel, and two clamping jaws which are arranged on each side of the said rotating member, which do not themselves rotate and which have a freedom of movement in the clamping direction of the said member for the purpose of braking it. One of the clamping jaws may be in a single piece while the second jaw may be in one or two pieces.

In the present description, there is meant by brake or the like a brake such as that defined above, in which the friction surfaces may be either flat so as to constitute a disc or a part of a disc properly speaking, or may be conical or cylindrical.

Brakes of this kind in which the gripping action on the rotating member is bilateral, that is to say consists of a pinching action, give excellent performance which cause them to be adopted, amongst others, on sports vehicles instead of the usual so-called drum brakes in which the gripping of the rotating member is unilateral. However, brakes as in the present invention, by the very reason of the fact that the clamping direction is in general perpendicular to the rotating surface, unlike drum brakes cannot take advantage of the phenomena known as the "winding-on" or "unwinding" of the jaws due to the frictional drag, and for this reason they do not have the self-gripping or self-release possessed by the latter type.

The present invention has for its object a disc-brake or the like which is free from this drawback and which possesses good qualities of self-gripping and/or self-release combined with a simple and convenient construction.

According to the invention, a first jaw of the brake has one degree of circumferential or tangential freedom with respect to a mean direction perpendicular to the axis of the wheel, while the second jaw, in one or two parts, is freely mounted with respect to the first jaw, preferably parallel to the said direction while having its travel limited with respect to the said first jaw, a fixed cylinder device, for example rigidly fixed to the wheel journal, comprising two pistons coupled to the second jaw with supporting means on the first jaw constituting angular transmission devices, a hydraulic control being provided in order to apply a fluid pressure on at least one of the pistons for the purpose of braking, so that the braking action proudced by this piston generates a braking reaction which is absorbed by the other piston.

The two pistons are preferably aligned along an axis parallel to the mean direction of the circumferential or tangential degree of freedom of the first jaw.

The travel of the second jaw with respect to the first jaw is limited by abutment means which may either be separate from the supporting and angular transmission means or may be constituted by these latter means themselves.

The supporting means which constitute angular transmissions may be provided in various forms, for example with rocker-arms, levers, blocks sliding on inclined surfaces, ar any other equivalent means adapted to provide a more or less accentuated degree of self-gripping or self-release in both directions of rotation, for example, equivalent to that of a usual type of drum brake having two jaws known as "single compression" or "single tension" or to that of another usual type of drum brake having a so-called "double compression" or "double tension" jaw, in which the self-gripping and self-releasing actions are more pronounced than in the first case.

The objects, charactertistic features and advantages of the invention will further become apparent from the description which follows below of forms of embodiment chosen by way of example, reference being made to the accompanying drawings, in which.

Reference will first be made to the diagram of FIG. 1 which shows an example of a brake control system for an automotive vehicle. This control is of the type described in U.S. Patent No. 3,044,581.

Figure 1:
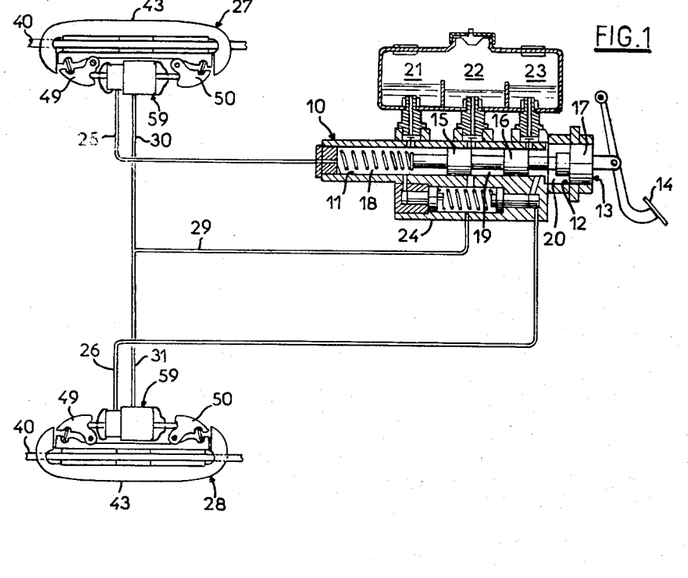
FIG. 1 is a diagram of a braking system for an automobile vehicle comprising disc brakes or the like, according to the invention.

There can be seen in FIG. 1 at 10 a master cylinder which comprises two cylindrical bores in line: a front bore 11 and rear bore 12 of larger diameter than the bore 11. In the bores 11 and 12 is mounted a sliding block 13 actuated by the brake pedal 14. The block 13 comprises two pistons 15 and 16 operating in the bore 11 and a piston 17 working in the bore 12. In front of the forward piston 15 is defined a primary chamber 18; between the pistons 15 and 16 is formed a secondary chamber 19, and between the pistons 16 and 17 is defined a further primary chamber 20.

The various chambers 18, 19 and 20 are connected to tanks 21, 22 and 23 through the intermediary of valves which can be rocked by the block 13. The chambers 18, 19 and 20 are further connected to a pressure-comparing station 24. The chambers 18 and 20 are respectively coupled to two primary conduits 25 and 26 going respectively to the right-hand wheel 27 and to the left-hand wheel 28.

Alternatively, the piston 16 may have a diameter different from that of the piston 15 and the chamber 19 may also displace a certain volume of oil, preferably small, into the conduit 29.

Figure 2:
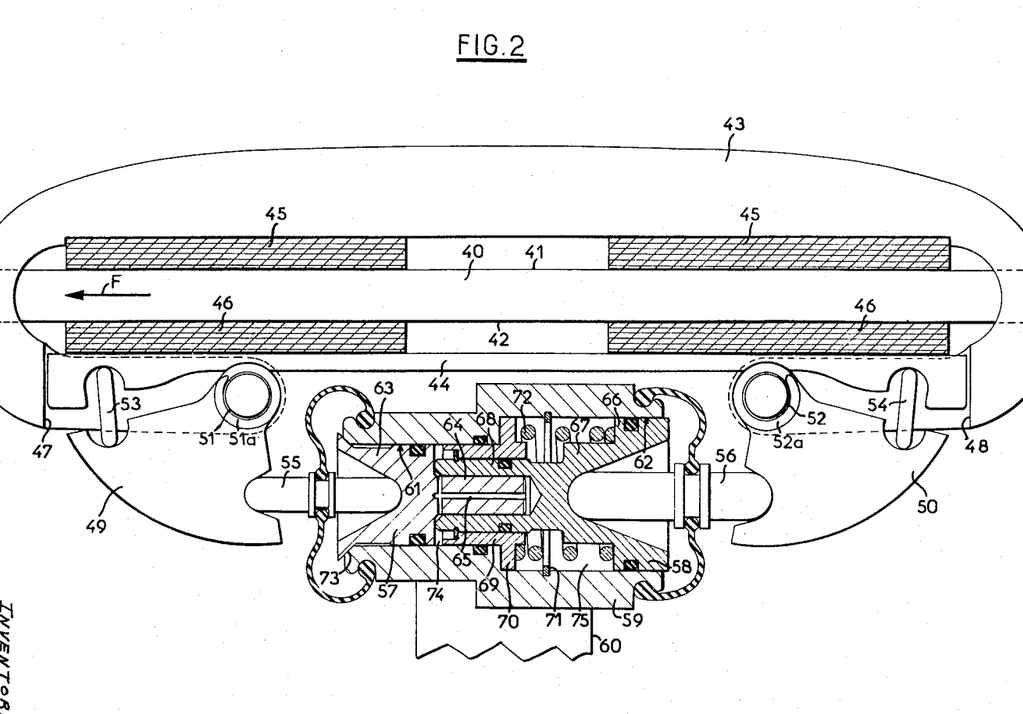
FIG. 2 is a view in cross-section in plan of a disc-brake in accordance with the invention.

Reference will now be made to FIG. 2, in which is shown an example of a brake according to the present invention, which corresponds to the brake 27 of the right hand wheel of the vehicle and at which terminate the primary conduit 25 and the secondary conduit 30.

The brake comprises a disc 40 which is rigidly fixed for rotation with the vehicle wheel and in which a flat portion perpendicular to the axis of the wheel has an outer face 41 and an inner face 42, and is intended to be gripped between a non-rotating outer jaw 43 provided with friction linings 45 and a non-rotating inner jaw 44 provided with friction linings 46. The linings 45 cooperate frictionally with the outer face 41 and the linings 46 cooperate frictionally with the inner face 42.

The outer jaw 43 is floating, but is guided by any appropriate means (not shown) so that it does not move away from a position fixed with respect to the disc 40, while having on the one hand a small latitude of movement circumferential or tangential to a mean direction perpendicular to the axis of the wheel, and on the other hand a small latitude of axial displacement.

The inner jaw 44 is mounted with respect to the outer jaw 43 with a small longitudinal play parallel to the said mean direction and limited between two stops 47 and 48 on the jaw 43 and also with an axial play.

Two rocker arms 49 and 50 form supporting means and angular transmission means and are pivotally mounted on pivots 51 and 52 rigidly fixed to the outer jaw 43, and are coupled to the inner jaw 44 respectively by two thrust bars 53 and 54.

The rocker-arms 49 and 50 are also connected by two push-rods 55 and 56 to two pistons in line 57 and 58 of a cylinder 59 which is rigidly fixed to the stub axle 60 of the wheel and the axis of which is longitudinal.

The cylinder 59 has preferably a construction similar to that described in U.S. Patent No. 3,203,512.

The cylinder 59 (see more particularly FIG. 2), is provided with two bores in line, a primary bore 61 of smaller diameter than the other secondary bore 62, and separated from each other by a shoulder.

The piston 57, known as the primary piston, is composed of a body 63 which is slidably engaged in the bore 61 and which comprises a sealing joint, and a tail portion 64 which is separated from the body 63 by a shoulder. Communicating passages 65 are formed in the tail 64.

The piston 58, known as the secondary piston, is composed of a body 66 which is slidably engaged in the bore 62 and which comprises a sealing joint, an intermediate boss 67 and a tail 68. The tail 68 comprises a cylindrical hole in which is engaged the tail 64 of the primary piston 57.

The tail 68 has an external diameter smaller than the diameter of the primary bore 61.

In the annular space comprised between the tail 68 and the bore 61 is engaged a ring 69. The ring 69 is provided with a small collar 70 which co-operates in abutment with the cylinder, preventing the ring 69 from going towards the primary side beyond a pre-determined position in the cylinder 59. The collar 70 also cooperates in abutment with a keeper-ring 71 embedded in the bore 62 and preventing the ring 69 from going towards the secondary side beyond a pre-determined position in the cylinder.

The small collar 70 forms a seating for a helicoidal centering spring 72 applied against the piston 58. The centering spring 72 tends to bring the ring 69 into abutment by its collar 70 on the cylinder. The primary piston 57 is provided with a shoulder 73 by which it is permitted to come into abutment against the cylinder 59 in order to define the position of rest of the said primary piston.

A primary chamber 74 is formed in the bore 61 and is de-limited in a fluid-tight manner by the piston 57, the tail 68 and the ring 69. It is connected to the primary conduit 25. The primary pressure which exists in this chamber acts on the primary piston 57 along the whole section of the bore 61, acts on the secondary piston 58 over the section of the tail 68, and acts on the ring 69 over the section of the bore 61 reduced by the section of the tail 68.

A secondary chamber 75 is formed in the bore 62 and is de-limited in a fluid-tight manner by the piston 58 and the ring 69. It is connected to the secondary conduit 30. The secondary pressure which exists in this chamber acts on the secondary piston 58 over the section of the bore 62 reduced by the section of the tail 68, on the cylinder 59 over the section of the bore 62 reduced by the section of the bore 61, and over the ring 69, on the section of the bore 61 reduced by the section of the tail 68.

The left-hand brake is of similar construction to that which has just been described for the right-hand brake, the chambers 74 and 75 of the left-hand brake being respectively connected to the conduits 26 and 31.

When the brake pedal 14 is released, the pressure is removed in the chambers 74 and 75. Elastic means, for example springs 51a and 52a, wound round the pivots 51 and 52, maintain the pistons 57 and 58 in the condition of maximum approach to each other, in which the tail 68 abuts against the body 63 of the piston 57, while the spring 72 imposes on the assembly 57–58 a precisely defined position in the cylinder 59 at which appropriate reserves of fluid are provided in the chambers 74 and 75.

The pistons 57 and 58 being thus maintained in definite positions, the axial degree of release of the jaws 45 and 46 is in turn precisely defined with respect to the disc 40.

When the brake pedal 14 is actuated, equal volumes of fluid are driven from the chambers 18 and 20 through the conduits 25 and 26 into the primary chambers 74 of the two brakes, while the primary chambers 18–25 and 20–26 are isolated from each other and from the secondary chamber 19–29–30–31. Each primary chamber 74 increases in volume, which has the effect of moving the pistons 57 and 58 away from each other and of causing the jaws 43 and 44 to move towards the disc 40 through the intermediary of the transmission system 55–49–51–53 and 56–50–52–54, in the same way as a nut cracker.

When the vehicle is running forwards (direction of the arrow F in FIG. 2), the coming into contact of the linings 45 and 46 of the jaws 43 and 44 with the disc 40 is accompanied by a tendency to a circumferential drive of these jaws in the direction F.

The jaw 44 comes into abutment at 47 against the jaw 43, so that this latter withstands the whole of the drive of the two jaws in the direction F. This drive, which results from the braking reaction, is finally absorbed by the piston 58, and the assembly 57–55–49–51–53–43–52–54–50–56 and 58 constitutes a chain of forces in a closed loop. This disc-brake thus possesses a degree of self-gripping which is equivalent to that of the usual type of drum brake with two jaws in simple compression.

The primary pressure in the chamber 74 actuates the brake, while the secondary pressure in the chamber 75, which is much higher than the primary pressure, absorbs the braking reaction by means of an inward movement of the secondary piston 58 towards the left-hand side of FIG. 2.

The secondary pressure is necessarily the same in the two brakes, since the conduits 30 and 31 are in communication at 29. Taking account of the differences in pressure which can possible arise in the two primary chambers 74 and which are due to dissimilar conditions of friction in the two wheels, an excellent balancing is observed, the secondary pressure playing a much more important part than each of the primary pressures, while the position of equilibrium of each of the parts is precisely determined.

If, during forward running, the secondary circuit 29–30–31 were to become broken, the device 24 (see FIG. 1) would immediately restore equality of pressure in the primary circuits 25 and 26, while each of the secondary pistons 58 would become supported on the ring 69 which is in turn in abutment at 70 on the cylinder. The braking thus remains operative, and this under acceptable conditions.

If, during forward running of the vehicle, one of the primary circuits 25 or 26 become defective, the secondary pressure maintained by virtue of the nondefective brake would then actuate the defective brake by means of the secondary piston 58. This latter piston effects the expansion alone, while the primary piston 57 is not operated and remains at rest at 73 on the cylinder 59. The operation of the brake thus remains effective although there results a slight reduction of the braking torque due to the disappearance of the primary pressure and a slight rocking action of the jaws 43 and 44 in the direction opposite to that of the arrow F.

During reverse running of the vehicle, the brake is actuated simultaneously by the primary pressure in the chamber 74 and by the secondary pressure in the chamber 75, while the primary piston 57 takes up the braking reaction and comes into abutment on the cylinder 59 by its collar 73. The secondary pressure is in this case much smaller than the primary pressure. Beyond a certain threshold of pressure, the ring 69 can be pushed back towards the right, and the spring 72 can be compressed by the preponderance of the primary pressure, up to the moment at which the ring 69 can come into abutment by its collar 70 upon the keeper-ring 71.

Figure 1A:
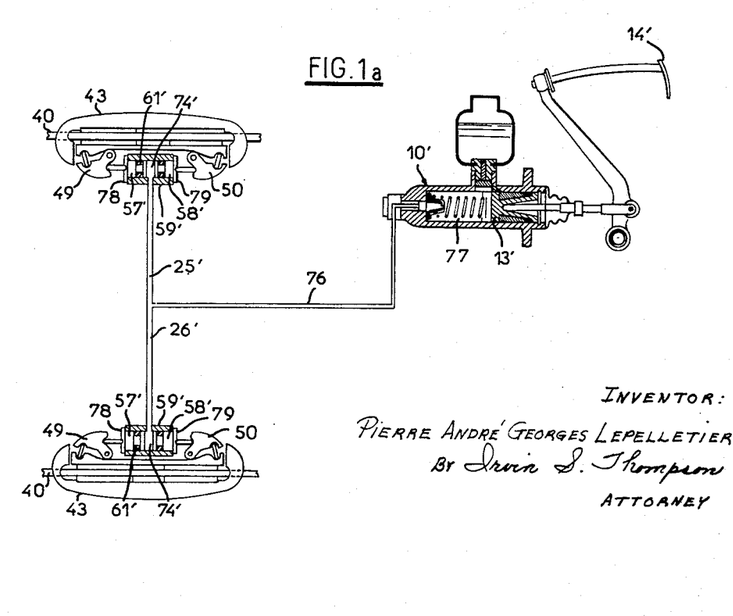
FIG. 1a is similar to FIG. 1, but relates to an alternative form of diagram.

It should be observed that the disc-brakes or the like in accordance with the invention, examples of construction of which have been described with reference to FIG. 2 and will be described below with reference to FIGS. 3 to 12, may be associated either with a control of the type described with reference to FIG. 1, and this with advantage, or with any other appropriate type of control, for example such as that shown in FIG. 1a. In this latter case, the two pistons 57' and 58' of each cylinder 59' are engaged in the same bore 61' of this cylinder, and define a single chamber 74'.

The chambers 74' of the two brakes are coupled to two conduits 25' and 26' connected by a single conduit 76 to a chamber 77 of a master cylinder 10' of conventional type, having a single piston 13' actuated by a pedal 14'. The two pistons 57' and 58' comprise respectively small collars 78 and 79 for abutment against the cylinder 59', these collars defining the position of rest, or in other words of maximum retraction of the said pistons under all circumstances.

Figure 3:
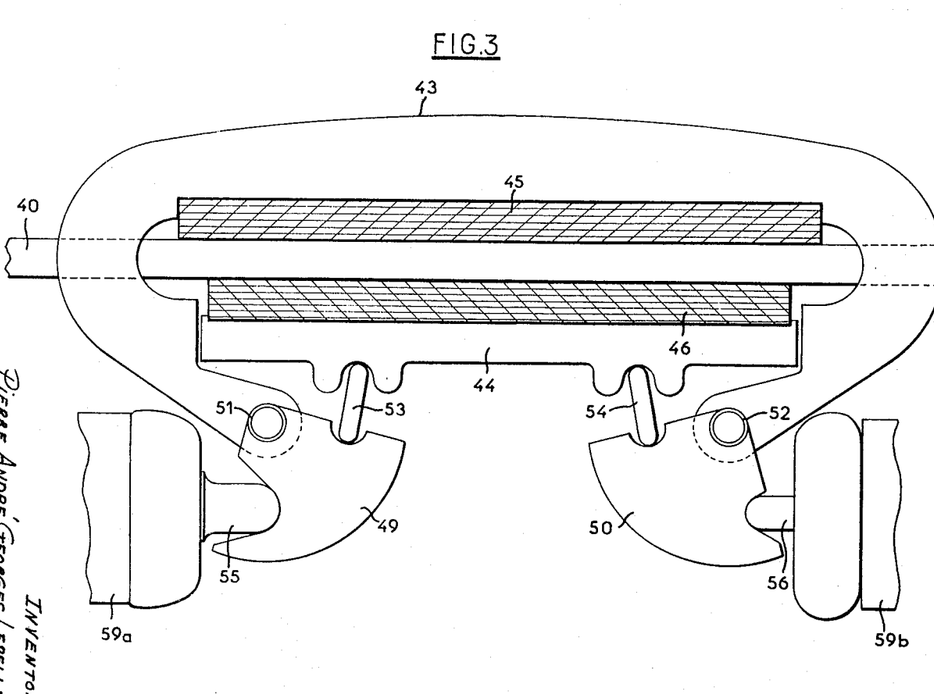
FIG. 3 is a view similar to FIG. 2 but concerning an alternative form of brake.

In the alternative form shown in FIG. 3, the arrangement is similar to that which has been described with reference to FIGS. 1 and 2, and there will again be seen the disc at 40, the jaws at 43 and 44 with their linings 45 and 46, the rocker-arms at 49 and 50, the thrust bars at 53 and 54 and the push-rods at 55 and 56, but in this case, the cylinder 59 is divided into two coaxial cylinders 59a and 59b. These latter are disposed on each side of the rocker-arms 49 and 50 and not between them as in the case of the cylinder 59 of FIG. 2. The operaton is simillar to that which has been described above with reference to FIGS. 1 and 2.

Figure 4:
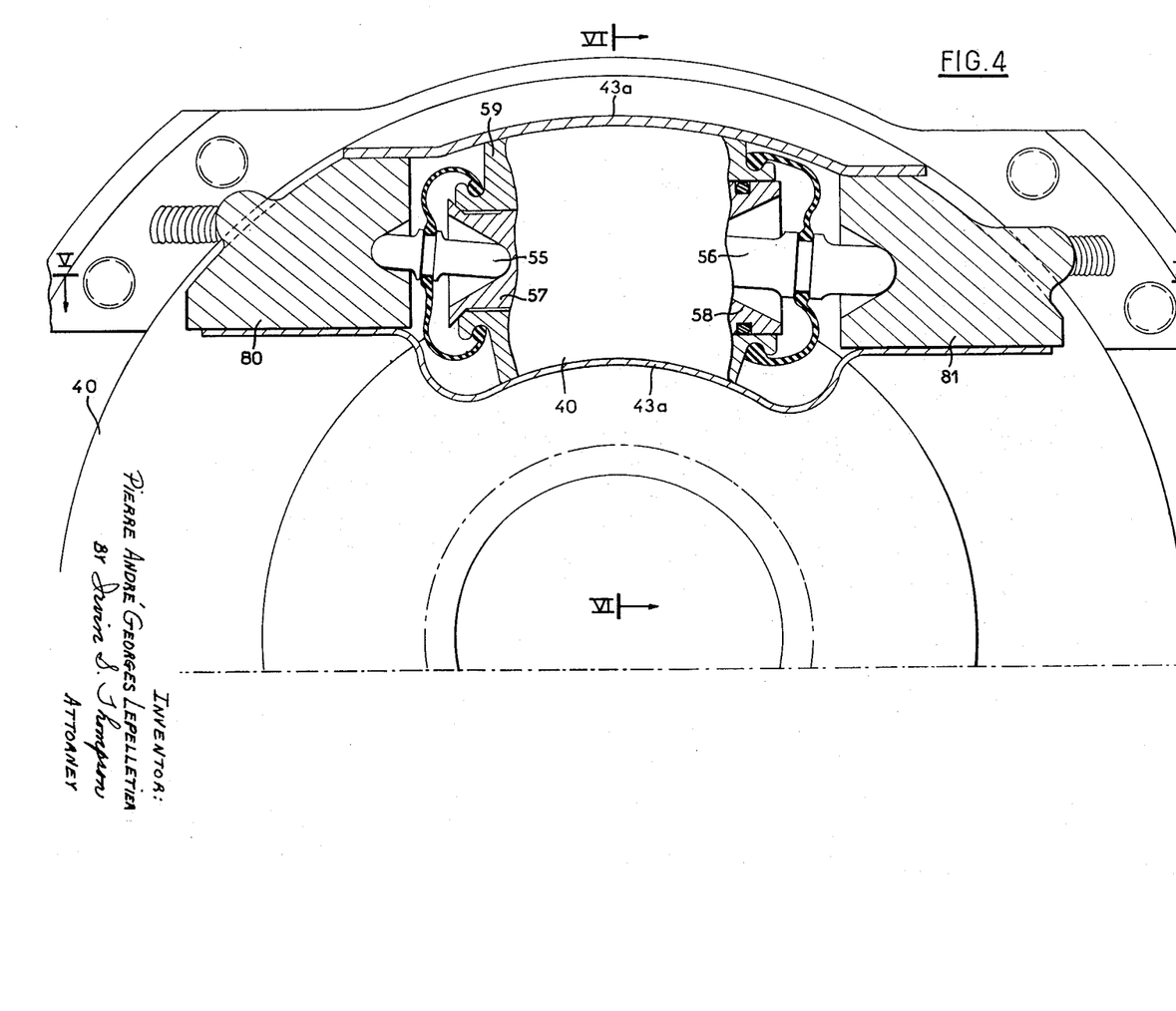
FIG. 4 is a view of a further alternative form of brake in vertical cross-section, taken along the line IV—IV of FIG. 5.
Figure 5:
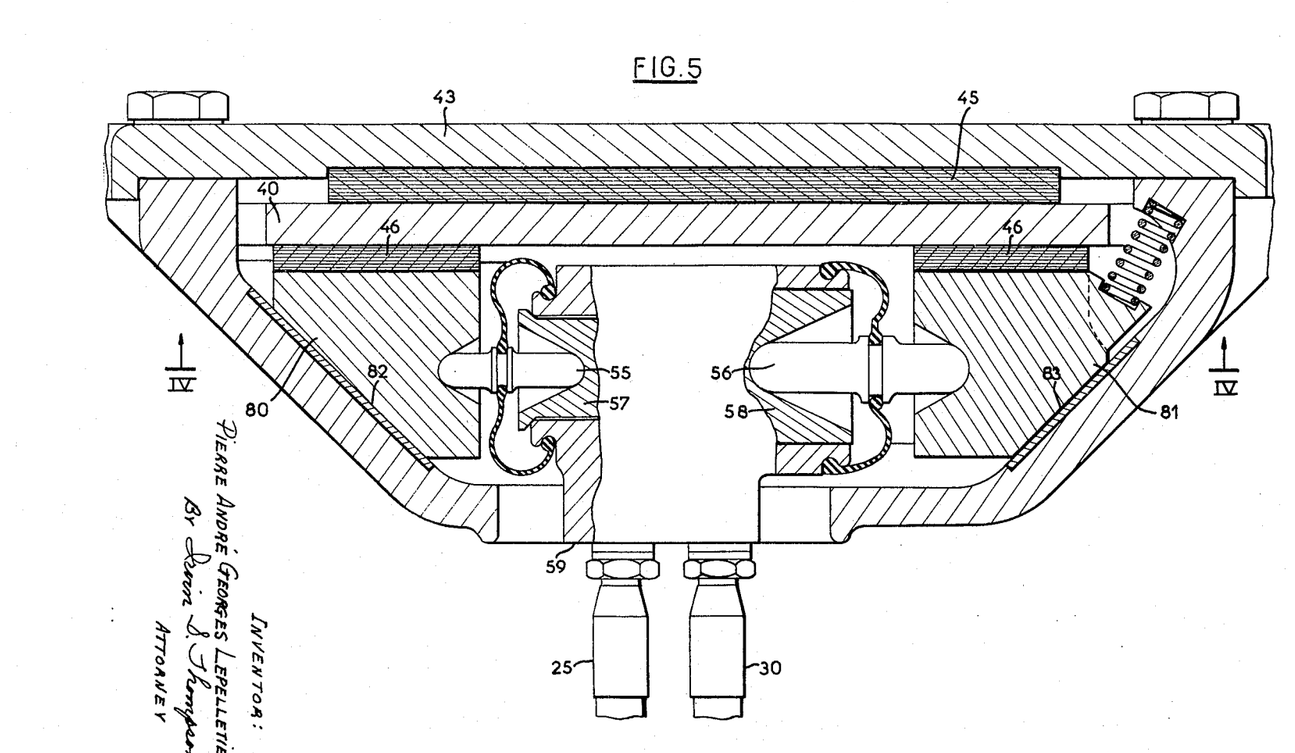
FIGS. 5 and 6 are corresponding views in cross-section, taken respectively along the lines V—V and VI—VI of FIG. 4.
Figure 6:
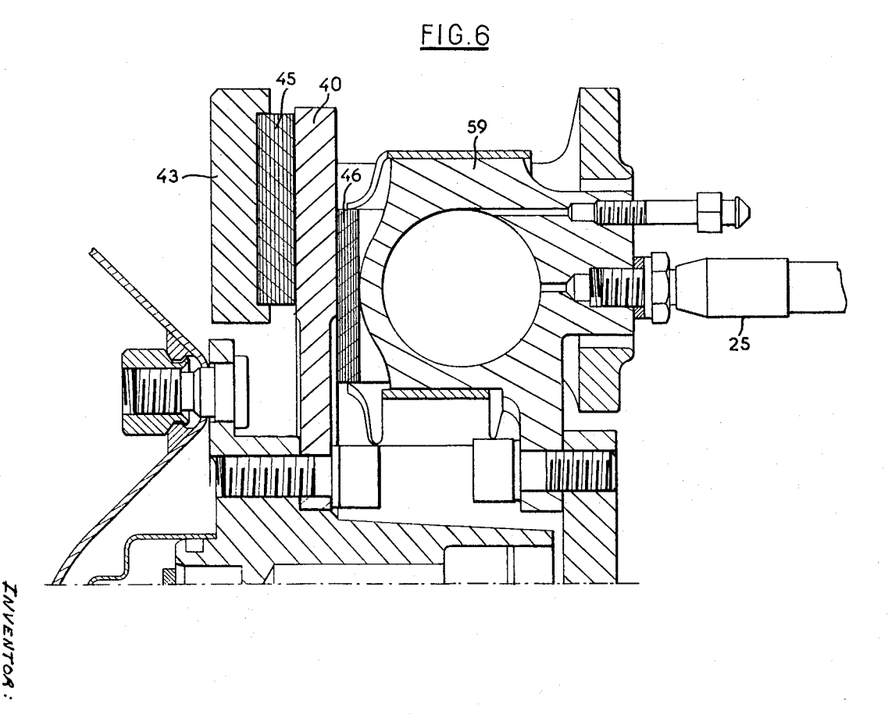

Reference will now be made to FIGS. 4 to 6, in which the arrangement is again similar to that of FIG. 2 and there will be recognized at 40 the disc, at 45 and 46 the brake linings, and at 59 the cylinder with the pistons 57 and 58 and the push-rods 55 and 56, but the second jaw 44 is in two parts, and the supporting and angular transmission means have been modified and comprise two blocks 80 and 81 which co-operate with the push-rods 55 and 56 respectively, and which constitute the two parts of the second jaw, carrying the linings 46. The blocks 80 and 81 slide respectively on the sloping faces 82 and 83, rigidly fixed to the jaw 43 which carries the lining 45. The first jaw 43 is guided circumferentially by small plates 43a, incurved with respect to a fixed portion constituted by the cylinder 59.

The operation is similar to that which has been described with reference to FIGS. 1 and 2, but the degree of self-gripping of the brake is more considerable than in the first case, and is equivalent to that of a conventional drum brake having a jaw with double compression.

Figure 7:
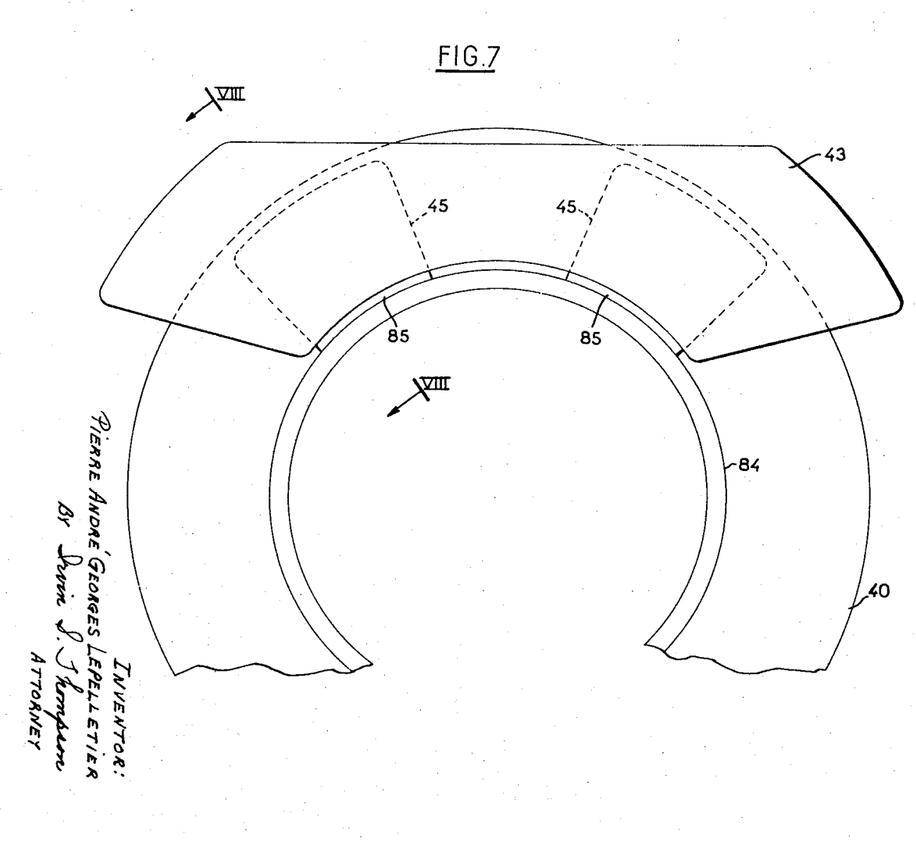
FIG. 7 represents a view in elevation of another alternative form of brake.
Figure 8:
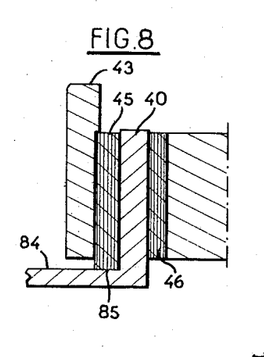
FIG. 8 is a partial view in cross-section, taken along the line VIII—VIII of FIG. 7.

The arrangement shown in FIGS. 7 and 8 is similar to that of FIGS. 4 to 6, but the means for circumferentially guiding the floating jaw 43 act with respect to a rotating portion. These means comprise a bearing surface 84 in the form of a drum which is rigidly fixed on the disc 40 and on which slide the concave arcuate surfaces 85 of the linings 45.

Figure 9:
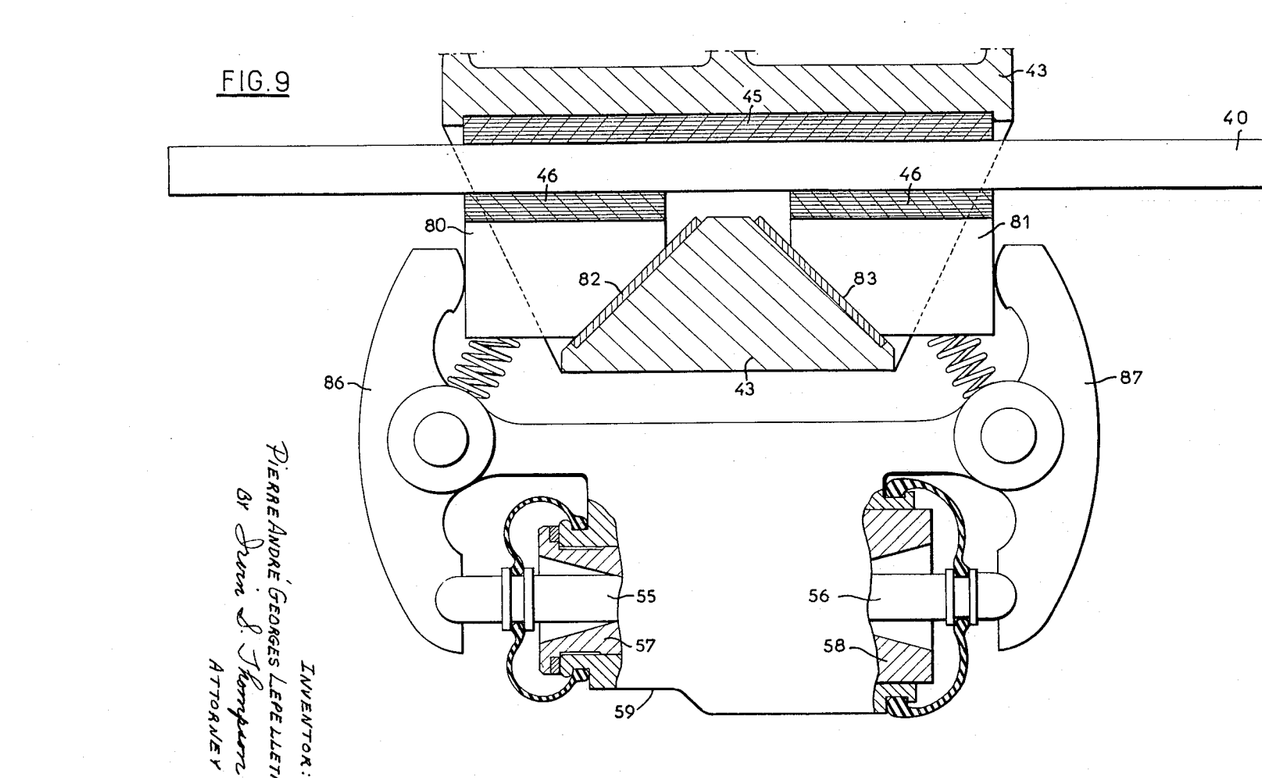
FIG. 9 is a view in plan of a further alternative form of brake.

In the example shown in FIGS. 4 to 6, the blocks 80 and 81 are aranged between the sloping faces 82 and 83, but they may also be arranged on each side of these faces as illustrated in FIG. 9. In this latter figure, it will be observed that pivoted levers 86 and 87 are interposed between the push-rods 55 and 56 and the blocks 80 and 81. Generally speaking, the supporting and angular transmission means could be actuated by the pistons through the intermediary of any other appropriate transmission devices.

Figure 10:
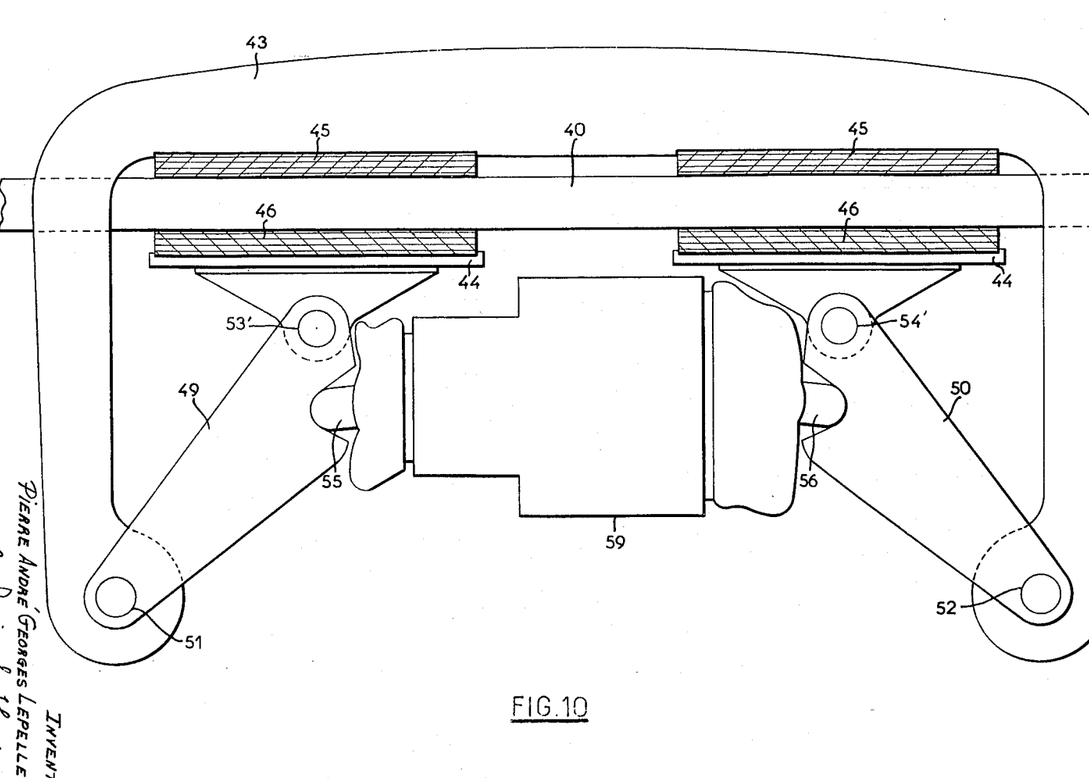
FIG. 10 is a plan view of a further embodiment of a brake.

It should be noted that an increased degree of self-gripping can be obtained, not only by an arrangement with sloping faces 82, 83, as shown in FIGS. 4 to 6 or in FIG. 9, but also by means of levers 49 and 50, similar to those of FIG. 2 but arranged in such manner that they produce an amplification of the forces, as shown in FIG. 10. In this figure, it will be seen that the push-rod 55 acts between the supporting pivot 51 and the transmission means, constituted in this case by a pivot 53'. This also applies to the push-rod 56 in respect of the pivots 52 and 54'.

In the forms of embodiment which have been described above, the rotating member 40 of the disc-brakes is constituted by a flat disc perpendicular to the axis of the wheel, but the invention is also applicable to all brakes similar to disc-brakes properly speaking, from the moment that the rotating member 40 is subjected to a bilateral gripping action for the purposes of braking. For example, the member 40 may have the shape of a cylindrical drum or it may be conical.

Figure 11:
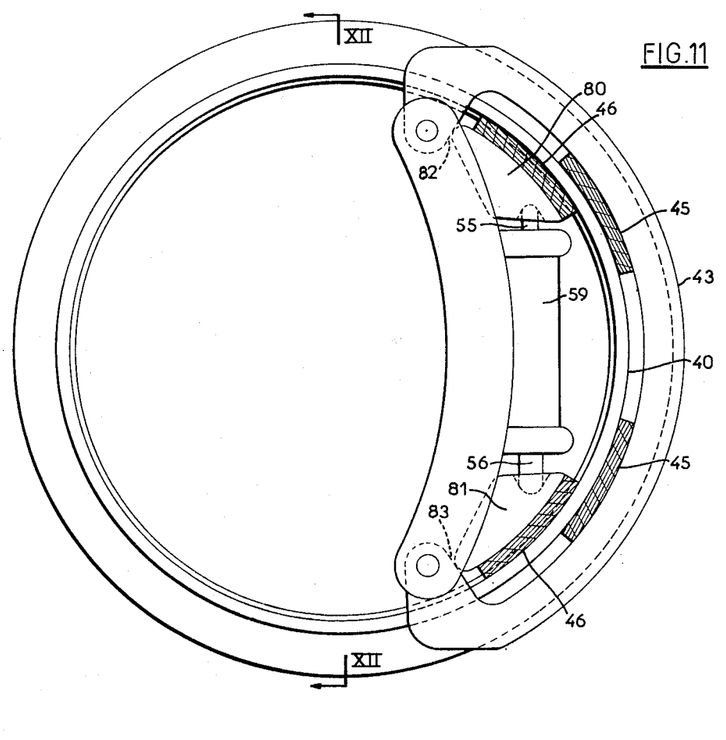
FIG. 11 is a view in elevation of an alternative form of brake in which the gripped portion is shaped in the form of a drum.
Figure 12:
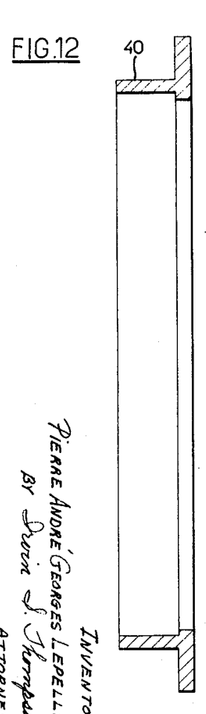
FIG. 12 is a partial view of this drum in cross-section, taken along the line XII—XII of FIG. 11.

An application of the invention to a member 40 having the shape of a cylindrical drum is shown in FIGS. 11 and 12. There will be recognized the first jaw at 43 with its linings 45. The arrangement is of the type shown in FIG. 4, in which the blocks 80 and 81, associated with the push-rods 55 and 56 of the pistons of the cylinder 59 co-operate with supporting faces 82 and 83 rigidly fixed to the jaw 43, and form the two jaws carrying the linings 46.

It will of course be understood that the invention is not restricted to the forms of construction described and shown, but embraces all alternative forms in the construction of its various elements and in its application. For example, in the case of FIG. 10 in particular, it is possible to dispense with the articulations 53' and 54' and to provide the jaws 44 rigidly fixed respectively to the levers 49 and 50.

What is claimed is:

1. A brake or the like, especially for automotive vehicles, comprising a rotating member fast for rotation with a wheel, a first gripping jaw, a second gripping jaw comprised of at least one part, said jaws being nonrotatably disposed on each side of said rotating member with freedom of movement in the gripping direction for the purpose of braking, said first jaw having a circumferential or tangential degree of freedom with a mean direction perpendicular to the axis of said wheel, said second jaw having a circumferential or tangential degree of freedom with respect to the first jaw and having a travel limited with respect to the first jaw, a fixed cylinder device comprising two pistons coupled to said second jaw, a hydraulic control device to supply fluid under pressure to at least one of said pistons for the purpose of braking, whereby the braking action produced by said one piston generates a braking reaction, and means for transmitting said braking reaction from said one piston through said first jaw to the other said piston.

2. A brake as claimed in claim 1, in which said two piston are aligned along an axis parallel to said mean direction.

3. A brake as claimed in claim 1, in which the travel of said second jaw with respect to the first jaw is limited by abutment means independent of said braking reaction transmitting means.

4. A brake as claimed in claim 1, in which the travel of said second jaw with respect to said first jaw is limited by abutment means formed by said braking reaction transmitting means.

5. A brake as claimed in claim 1, in which said fixed cylinder device comprises a cylinder adapted to receive said two pistons.

6. A brake as claimed in claim 1, in which said braking reaction transmitting means are disposed on each end of said cylinder device.

7. A brake as claimed in claim 1, in which said fixed cylinder device comprises two separate cylinders, spaced apart and adapted to receive respectively said two pistons and disposed on each side of said braking reaction transmitting means.

8. A brake as claimed in claim 1, in which said cylinder device has a single supply, and the two said pistons are subjected to the pressure of a single chamber connected to the cylinder device.

9. A brake as claimed in claim 1, in which the gripped surface of said rotating member is flat.

10. A brake as claimed in claim 1, in which the gripped surface of said rotating member is conical.

11. A brake as claimed in claim 1, in which the gripped surface of said rotating member is cylindrical.

12. A brake as claimed in claim 1, in which said braking reaction transmitting means are actuated by said pistons through the intermediary of other transmission means.

13. A brake as claimed in claim 1, in which said first jaw is guided circumferentially or tangentially with respect to a fixed portion of the brake.

14. A brake as claimed in claim 1, in which said first jaw is guided circumferentially with respect to a rotating portion of the brake.

15. A brake as claimed in claim 1, in which said braking reaction transmitting means comprise two rocker arms which are pivotally mounted on pivots fast with said first jaw and which are interposed between said second jaw and said pistons.

16. A brake as claimed in claim 1, in which said cylinder device has a double supply and comprises a primary chamber for one of said pistons or the primary piston and a secondary chamber for the other said piston or secondary piston.

17. A brake as claimed in claim 15, in which push rods are disposed between said rocker arms and said pistons.

18. A brake as claimed in claim 15, in which each said rocker arm is coupled to the second jaw by a thrust bar.

19. A brake as claimed in claim 15, in which said second jaw is made in two parts and said two rocker arms are coupled to said parts each by an articulation.

20. A brake as claimed in claim 15, in which said second jaw is in two parts, and said braking reaction transmitting means comprise blocks which form the two said parts of said second jaw and which slide on sloping surfaces of said first jaw.

21. A brake as claimed in claim 16, applied to a motor vehicle having an axle and two wheels on the axle and a said brake associated with each said wheel, in which the two primary chambers of the two wheels of one axle are connected by two primary conduits to a master cylinder which expels equal volumes of fluid into said chambers.

22. A brake as claimed in claim 16, applied to a motor vehicle having an axle and two wheels on the axle and a said brake associated with each said wheel, in which the two secondary chambers of the two wheels of one axle are connected to a single secondary circuit which balances the braking reactions.

23. A brake as claimed in claim 16, in which the secondary piston has a larger diameter than the primary piston, and has a tail surrounded by a moving ring engaged in said primary chamber which is defined in the cylinder by said primary piston, the tail of the secondary piston and the said ring, while the secondary chamber is defined in said cylinder by the secondary piston and the ring.

References Cited by the Examiner

UNITED STATES PATENTS

| | | | |
|---|---|---|---|
| 2,710,675 | 6/1955 | Murphy | 188—76 |
| 2,787,340 | 4/1957 | Murphy | 188—76 |
| 2,983,338 | 5/1961 | Vansteenkiste | 188—73 |
| 3,035,664 | 5/1962 | Desvignes et al. | 188—73 |
| 3,044,581 | 7/1962 | Lepelletier | 188—152 |
| 3,137,370 | 6/1964 | Lepelletier | 188—73 X |
| 3,159,245 | 12/1964 | Dotto | 188—76 |
| 3,173,517 | 3/1965 | Powlas | 188—152 |

FOREIGN PATENTS

| | | |
|---|---|---|
| 952,867 | 11/1956 | Germany. |
| 1,019,873 | 11/1957 | Germany. |

MILTON BUCHLER, *Primary Examiner.*

FERGUS S. MIDDLETON, *Examiner.*

G. E. A. HALVOSA, *Assistant Examiner.*